United States Patent Office 3,488,032
Patented Jan. 6, 1970

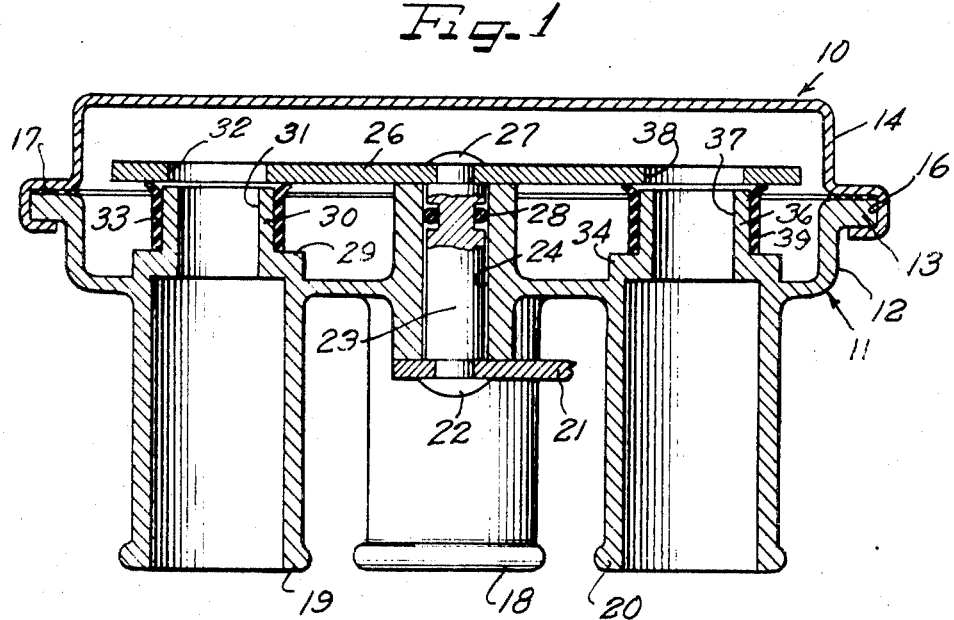
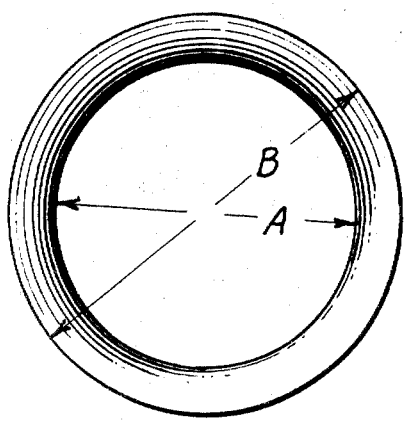
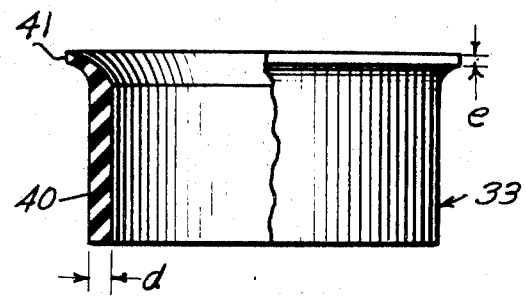

3,488,032
DUAL OUTLET WATER VALVE
Arthur A. Scott, Prospect Heights, Ill., assignor to The Dole Valve Company, Morton Grove, Ill., a corporation of Illinois
Filed May 3, 1967, Ser. No. 635,817
Int. Cl. F16k 25/00; E03b 7/07
U.S. Cl. 251—172           1 Claim

ABSTRACT OF THE DISCLOSURE

A dual outlet flow control water valve wherein the inlet, one or more outlets and a control lever extend from a single side of the valve. The outlets formed in the housing include an annular flange portion on the inner surface of said single wall and a cylindrical portion extending axially from the annular flange to form a port. An apertured plate is rotatably mounted within the housing and adjacent the extended ends of the cylindrical porions of the ports such that in one position the aperture in the plate overlies the port thereby providing a fluid passage beween the inlet and the outlets and in another position the aperture in the plate is displaced from the port to interrupt the fluid passage between the inlet and the outlets. A seal is mouned over the cylindrical portions of the outlets and extend therefrom to engage a surface of the rotatable plate to effect a fluid tight seal therebetween.

BACKGROUND OF THE INVENTION

Field of the invention

This invention relates generally to fluid control valves and more particularly to a dual outlet water flow control valve wherein all inlet and outlet ports and control linkages extend from one side of the valve body. Specifically, the present invention relates to a unique and novel valve structure including a unitary annular seal which is positioned over a cylindrical portion within the valve body and extends therefrom to engage a control surface.

Description of the prior art

Flow control valves of the type utilizing a rotatable apertured plate slidably engageable with a seal which surrounds a port is well known in the art. However, such flow control valves heretofore have been relatively complex in that they require additional or special components within the valve to maintain the seal in positive contact with the surface of the rotatable plate. Also, the control valves of the prior art have been constructed such that the inlet and/or outlets and control linkages extend from the valve body from two or more sides of the body.

SUMMARY

Accordingly, one important object of the present invention is to provide a flow control valve with a unique and novel seal arrangement such that the valve construction is greatly simplified while affording proper and reliable operation of the valve.

Another object of the present invention is to provide a flow control valve having the inlet and outlets and control linkages extending from one side of the valve.

A still further object of the present invention is the use of a single unitary seal construction wherein the seal includes a cylindrical body portion and a radially outwardly extended portion contiguous with the body portion and having a lesser cross-sectional dimension than the body portion.

These and other objects will be more fully realized and understood from the following detailed description when taken in conjunction with the accompanying drawings in which like reference numerals throughout the various views of the drawings are intended to designate similar elements or components.

BRIEF DESCRIPTION OF THE DRAWING

FIGURE 1 is an elevational sectional view of a dual outlet flow control valve which is constructed in accordance with the principles of this invention;

FIGURE 2 is a top plan view of a seal utilized in the flow control valve of FIGURE 1; and FIGURE 3 is an elevational sectional view of the seal of FIGURE 2.

DESCRIPTION OF THE PREFERRED EMBODIMENT

As seen in FIGURE 1, a valve 10 includes a housing 11 which is formed by a casting 12 which has an annular flange 13 formed about the periphery thereof. A formed cover 14 includes an annular groove 16 which engages the flange 14. A gasket 17 is positioned within the groove 16 to engage a portion of the inner surface of the groove and the flange 17 to form a fluid tight seal therebetween.

The casing 12 of the housing 11 has an inlet 18 and a pair of outlets 19 and 20 formed thereon. A control link 21, shown partially broken away for clarity, is secured to a rotatable shaft 23 by a rivet 22. The rivet 22 may be formed as an integral part of one end of the shaft 23. The shaft 23 passes through an aperture 24 formed in the casing 12 and extends into the interior of the valve 10. A rotatable plate 26 is connected to the other end of the shaft 23 by a rivet 27 which, in turn, may also be formed as an integral part of the shaft 23. An O-ring 28 is positioned about the shaft 23 and recessed into a groove formed therein. The O-ring 28 forms a fluid tight seal between the shaft 23 and the surface forming the aperture 24.

The outlet 19 includes an annular shoulder 29 and a cylindrical portion 30 extending upwardly from the shoulder 29 and terminating within the interior of the valve 10. A port 31 is formed through the cylindrical portion 30 and the annular shoulder 29, and is shown in registry with an aperture 32 formed within the plate 26. A seal 33 is positioned about the cylindrical portion 30 and extends upwardly therefrom to engage the undersurface of the plate 26 to form a fluid tight seal therewith.

The outlet 20 includes an annular shoulder 34 and a cylindrical portion 36 extending upwardly therefrom. A port 37 passes through the cylindrical portion 36 and the shoulder 34, and is shown in registry with an aperture 38 formed in the plate 26. A seal 39 is positioned about the cylindrical portion 36 and extends upwardly therefrom and engages the undersurface of the plate 26 to form a fluid tight seal therewith.

In operation, fluid flows through the inlet 18 and into the housing 11 and therefrom to the outlets 19 and 20. However, by rotating the shaft 23 by the control link 21, the plate 26 rotates such that the seals 33 and 39 engage flat contiguous portions of the plate 26 thereby preventing fluid flow through the ports 31 and 37. The seals 33 and 39 are so constructed so as to afford a minimum of frictional resistance to the rotation of the plate 26 while maintaining an absolute fluid seal therewith. Furthermore, the fluid pressure which is sensed within the valve housing 11 presses against the peripheral edges of the seal thereby forcing the seal into firm contact with the undersurface of the plate 26.

Seen in FIGURES 2 and 3 is the detailed construction of the seal 33. As the seals 33 and 39 are identical, only one will be described herein. The seal 33 includes a cylindrical portion 40 and an annular outward lip portion 41 contiguous therewith. The cross sectional dimension of the wall of the cylindrical portion 40 is sufficient to support the seal under pressure from the plate 26. On the other hand, the cross sectional dimension of the annular portion 41 is sufficiently small so as to be resilient thereby taking advantage of the pressure within the housing 11 to urge the annular portion 41 more firmly against the plate 26.

In the preferred embodiment, the wall thickness $d$ of the cylindrical portion 40 is .040 inch while the cross sectional dimension of the annular portion 41 is .020 inch. Also, the inside diameter A is preferably .600 inch while the outside diameter of the annular portion 41 is .760 inch. The cylindrical portion 40 of the seal 33 extends .200 inch while the annular portion 41 extends approximately .05 inch, thereby providing a total axial extent of the seal of .250 inch.

By utilizing the unique and novel valve construction and seal arrangement, the complexity of the valve is greatly reduced. Also, the assembly of the valve is simplified in that the seal may be stretched over the cylindrical portions 30 and 36 of the casing 12 prior to assembly of the valve without the use of special tools for alignment of the seal.

Also, the unique and novel valve structure of the present invention provides a flow control valve which can be mounted in a limited axis area since the intake and outlet ports and control linkages of the valve extend from a single side thereof.

I claim as my invention:

1. A valve body having an inlet and an outlet and a control chamber communicating the inlet with the outlet, said outlet having a cylindrical boss extending into the control chamber, said cylindrical boss having a radially reduced portion forming a shoulder facing into said control chamber, a resilient sleeve fitted over said cylindrical boss, a valve plate rotatably mounted within said control chamber and having an aperture formed therein which is movable by rotary motion of said valve plate into and out of alignment with said outlet at said boss, said resilient sleeve having a cylindrical wall portion and a outwardly flared tapered more resilient lip portion, said lip portion being spaced from the end of said boss and extending into said control chamber in a direction toward said valve plate at an angle less than 90° with the axis of said cylindrical wall portion, said valve plate being positioned in sealing relationship with the outwardly flared tapered more resilient lip portion of the resilient sleeve, whereby said lip portion of said resilient sleeve maintains a seal with said plate during rotary motions thereof.

References Cited

UNITED STATES PATENTS

| Re. 24,055 | 8/1955 | Daniels | 137—625.46 X |
|---|---|---|---|
| 2,908,293 | 10/1959 | Johnson | 137—625.46 |
| 2,973,181 | 2/1961 | Johnson | 251—317 X |
| 2,988,108 | 6/1961 | Malmquist et al. | 137—625.46 |

M. CARY NELSON, Primary Examiner

MICHAEL O. STURM, Assistant Examiner

U.S. Cl. X.R.

137—625.46